US010137468B2

(12) United States Patent
Robert

(10) Patent No.: US 10,137,468 B2
(45) Date of Patent: Nov. 27, 2018

(54) DEVICE FOR SUPPLYING A SPRAYER WITH A LIQUID COATING PRODUCT AND TOOL FOR MOUNTING/DISMOUNTING SUCH A DEVICE

(71) Applicant: SAMES TECHNOLOGIES, Meylan (FR)

(72) Inventor: Stéphane Robert, Meylan (FR)

(73) Assignee: SAMES KREMLIN, Meylan (FR)

( * ) Notice: Subject to any disclaimer, the term of this patent is extended or adjusted under 35 U.S.C. 154(b) by 84 days.

(21) Appl. No.: 15/031,767

(22) PCT Filed: Nov. 3, 2014

(86) PCT No.: PCT/EP2014/073539
§ 371 (c)(1),
(2) Date: Apr. 25, 2016

(87) PCT Pub. No.: WO2015/063288
PCT Pub. Date: May 7, 2015

(65) Prior Publication Data
US 2016/0243572 A1 Aug. 25, 2016

(30) Foreign Application Priority Data

Nov. 4, 2013 (FR) .................. 13 60790

(51) Int. Cl.
F16K 31/00 (2006.01)
B05B 12/14 (2006.01)
(Continued)

(52) U.S. Cl.
CPC .............. B05B 12/149 (2013.01); F16K 1/32 (2013.01); F16K 31/122 (2013.01); Y10T 137/87571 (2015.04)

(58) Field of Classification Search
CPC ..... B05B 12/149; B05B 13/0457; F16K 1/32; F16K 31/122; F16K 31/1221; F16K 31/1226
(Continued)

(56) References Cited

U.S. PATENT DOCUMENTS 3,334,648 A * 8/1967 Probst .................. B05B 9/0403
137/238
3,741,251 A * 6/1973 Rees ........................ F16F 9/38
138/96 R
(Continued)

FOREIGN PATENT DOCUMENTS

CN 2368656 Y 3/2000
CN 2706279 Y 6/2005
(Continued)

OTHER PUBLICATIONS

French Search Report for FR1360790 dated Jul. 18, 2014.
International Search Report for PCT/EP2014/073539 dated Feb. 16, 2015.

Primary Examiner — Umashankar Venkatesan
(74) Attorney, Agent, or Firm — Pearne & Gordon LLP

(57) ABSTRACT

A device for supplying a sprayer with a liquid coating comprises a one valve having a moving needle, a valve body defining a circulation volume for the coating and a seat for supporting the needle. A pneumatic drive for translating the needle along an axis away from or towards the seat comprises a piston constrained to move with the needle and sliding within a guide body. A head and the guide body define a variable volume chamber. The head is constrained to rotate with the volume via slots on the head and corresponding protruding elements on the guide body. The guide body is screwed onto the valve body along the axis. The head includes driving reliefs for rotation of the head around the axis for screwing onto the valve body. A tool for
(Continued)

mounting/dismounting the device comprises a maneuvering handle and an end-piece having reliefs complementary to the driving reliefs.

5 Claims, 14 Drawing Sheets

(51) Int. Cl.
    *F16K 1/32*         (2006.01)
    *F16K 31/122*    (2006.01)

(58) Field of Classification Search
    USPC .................................. 251/63.5; 137/602, 551
    See application file for complete search history.

(56) References Cited

U.S. PATENT DOCUMENTS

| | | | | |
|---|---|---|---|---|
| 5,873,385 | A * | 2/1999 | Bloom | F16K 15/028 |
| | | | | 137/535 |
| 6,908,048 | B2 * | 6/2005 | Di Gioia | B05B 7/1404 |
| | | | | 239/302 |
| 7,712,484 | B2 * | 5/2010 | Fukano | B05B 12/149 |
| | | | | 137/606 |
| 8,087,641 | B2 * | 1/2012 | Masamura | F16K 27/0236 |
| | | | | 251/331 |
| 8,267,372 | B2 * | 9/2012 | Masamura | F16K 35/027 |
| | | | | 251/101 |
| 2006/0038154 | A1 | 2/2006 | Fukano et al. | |
| 2006/0065868 | A1 * | 3/2006 | Strong | F16K 31/1221 |
| | | | | 251/63.5 |
| 2011/0233445 | A1 * | 9/2011 | Robert | B05B 9/03 |
| | | | | 251/333 |
| 2015/0021506 | A1 * | 1/2015 | Kinser | F16K 27/02 |
| | | | | 251/291 |

FOREIGN PATENT DOCUMENTS

| | | |
|---|---|---|
| CN | 1734140 A | 2/2006 |
| CN | 1796844 A | 7/2006 |
| CN | 201218262 Y | 4/2009 |
| CN | 102292579 A | 12/2011 |
| CN | 203540805 U | 4/2014 |
| DE | 29814489 U1 | 12/1999 |
| DE | 102005033191 A1 | 2/2006 |
| EP | 1640649 A1 | 3/2006 |
| EP | 2356356 A1 | 8/2011 |
| WO | 02/09886 A1 | 2/2002 |
| WO | 2010-067016 A1 | 6/2010 |

* cited by examiner

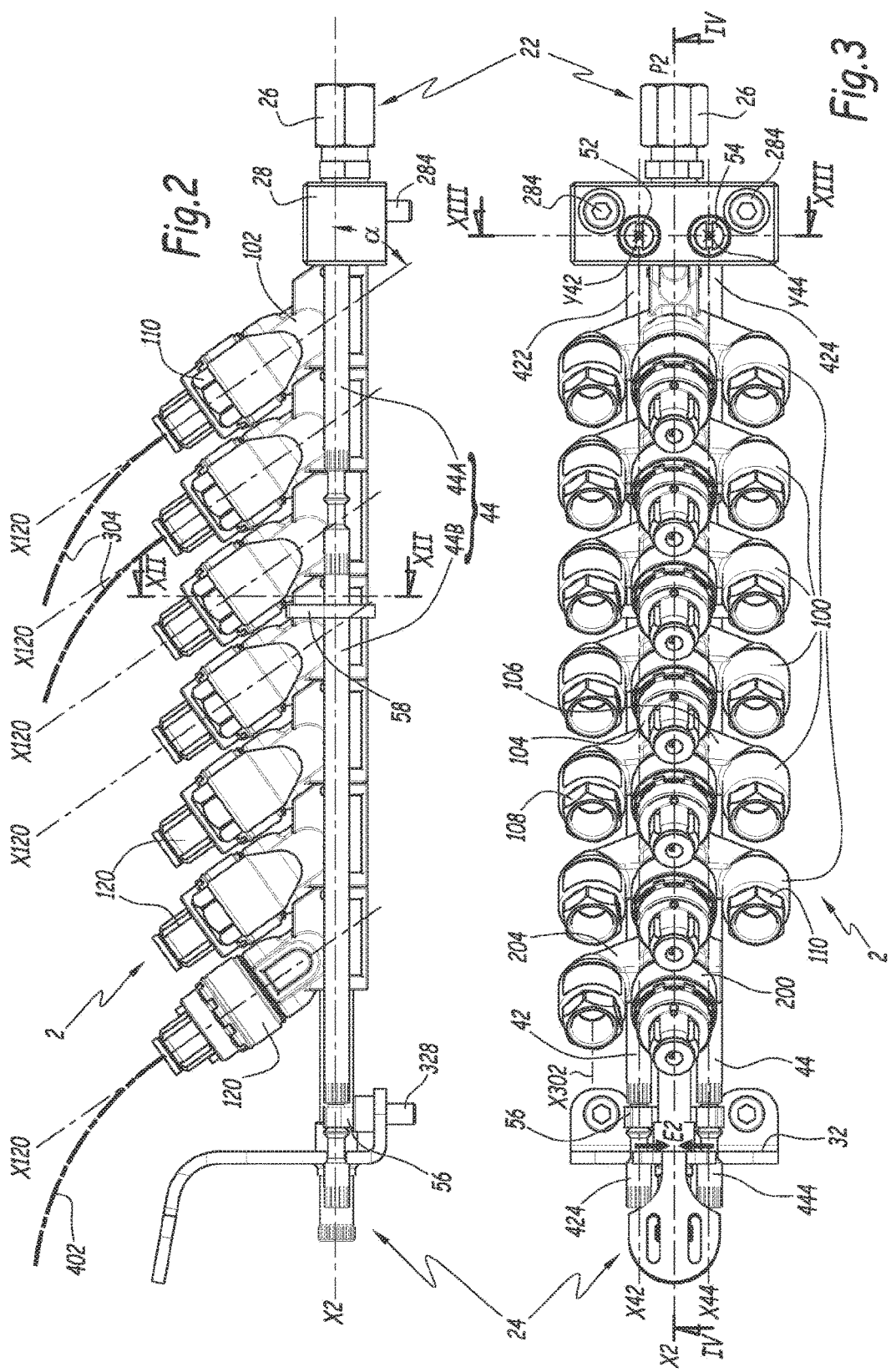

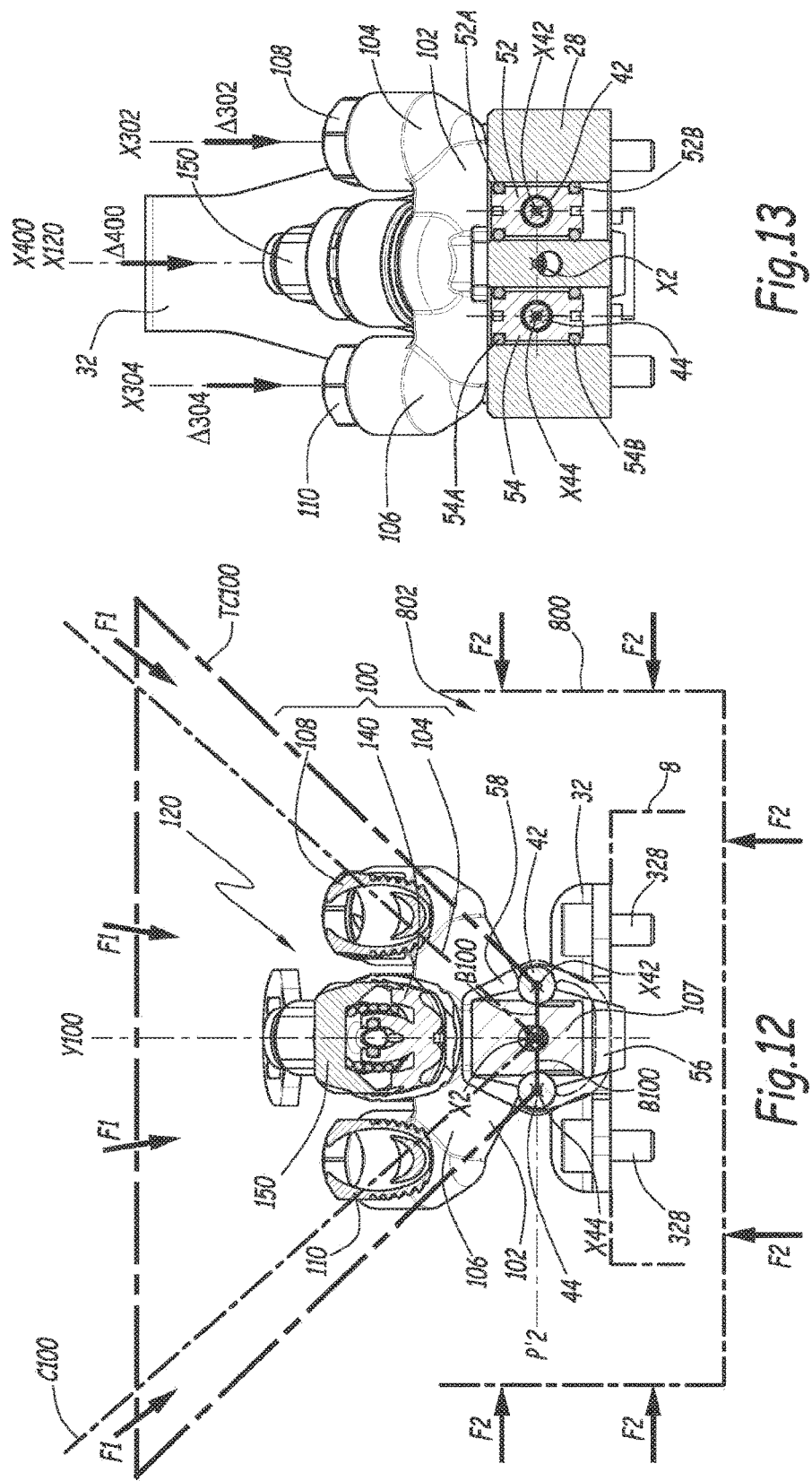

DEVICE FOR SUPPLYING A SPRAYER WITH A LIQUID COATING PRODUCT AND TOOL FOR MOUNTING/DISMOUNTING SUCH A DEVICE

This is a National Stage application of PCT international application PCT/EP2014/073539, filed on Nov. 3, 2014 which claims the priority of French Patent Application No. 13 60790 entitled "DEVICE FOR SUPPLYING A SPRAYER WITH A LIQUID COATING PRODUCT AND TOOL FOR MOUNTING/DISMOUNTING SUCH A DEVICE", filed Nov. 4, 2013, both of which are incorporated herein by reference in their entirety.

The present invention relates to a device for supplying a sprayer with a liquid coating product, in particular in a coating product spraying facility as used to apply primer, paint, or varnish on a motor vehicle body. The invention also relates to a tool for mounting/dismounting such a supply device.

In the field of spraying coating product on objects to be coated, whether it involves motor vehicle bodies or other materials, it is known to supply a cleaning product sprayer with several products, one of which is applied on each object to be coated based on the characteristics of that object. For example, it is known to supply a motor vehicle body coating sprayer with several coating products of different shades, which makes it possible to adapt the shade applied on the vehicle.

To that end, it is known to use a supply device that comprises at least one valve, and in practice several valves, each valve controlling the flow of a coating product toward the sprayer. Thus, U.S. Pat. No. 4,627,465 discloses a modular color changing device that comprises subassemblies each including a pneumatically controlled valve and controlling the flow of a product, such as a paint, and a supply line of several sprayers.

Furthermore, EP-A-1,640,649 discloses a valve that can be used in a supply device of a sprayer and that comprises a piston secured to a needle equipped with a diaphragm and intended to bear selectively against the seat. The piston is secured to a rod in which a supply line is arranged for a variable volume chamber, this rod having to be connected to a flexible air supply pipe of the valve. If the supply pipe is blocked by an outside element, the movements of the piston can be hindered, which causes malfunctions of the valve. This risk is even more pronounced when the valve is installed in a confined environment, such as the inside of the arm of a multiaxial robot. Yet more and more often, coating product spraying facilities comprise multiaxial robots that move sprayers across from objects to be coated. In this valve, a head is screwed on the guide body, which does not guarantee rotational securing between these parts, resulting in a risk of misadjustment.

EP-A-2,356,656 discloses a double-needle valve that does not comprise a guide body fixed on a valve body.

The invention more particularly aims to resolve these drawbacks by proposing a new device for supplying at least one sprayer with coating product that comprises a valve with a reliabilized operation.

To that end, the invention relates to a device for supplying at least one sprayer with a liquid coating product, this device comprising at least one control valve controlling the flow of the coating product toward the sprayer, this valve in turn comprising a moving needle, a valve body that defines a circulation volume for the coating product, a bearing seat for the needle in the closed configuration of the valve, and pneumatic driving means for translating the needle along an axis of separation/approach with respect to the seat, while the pneumatic driving means comprise a piston secured in translation with the needle and mounted sliding in a guide body. The valve also comprises a head mounted on the guide body and which defines, with the latter, a variable volume chamber in which an elastic return member is provided for returning the piston to its position. According to the invention, the head and the guide body are secured in rotation using corresponding reliefs respectively arranged on the head and on the guide body and that comprise slots arranged on one edge of the guide body opposite the needle, respectively on one edge of the head, and protruding elements arranged on an outer radial surface of the head, of the guide body, respectively, and received in spaces defined between the slots.

Owing to the invention, the assembly to each valve is lasting and a subassembly comprising the guide body, the head, the pneumatic means and the needle is robust and can be easily manipulated, in particular for its mounting on the valve body. The assembly thus formed in particular makes it possible to transmit the tightening torque from the head toward the guide body, which includes the fastening function on the valve body by the thread, owing to the cooperation of the slots and the protruding elements that are firmly immobilized, at least in rotation, relative to one another.

According to advantageous, but optional aspects of the invention, such a supply device may incorporate one or more of the following features, considered in any technically allowable combination:

- The slots are arranged on one edge of the guide body opposite the needle and define, between them, zones for receiving teeth that extend outwardly, radially to the axis of separation/approach, relative to the outer radial surface of the head, while these slots and these teeth cooperate to secure the head and the guide body both axially and in rotation relative to the axis of separation/approach.
- The guide body is screwed on the valve body, with its screwing axis combined with the axis of separation/approach, while the head is equipped with reliefs driving rotation around the screwing axis of the guide body on the valve body. Owing to this aspect of the invention, it is particularly quick and easy to mount a subassembly comprising the needle, the piston, the drive means, the head and the guide body on a base body, by screwing this subassembly on the base body through a rotational movement around the axis of alignment/approach between the needle and the seat, this rotational movement being imparted to this subassembly via driving reliefs of the head.
- The rotational driving reliefs are longitudinal notches that extend parallel to the screwing axis of the guide body on the valve body.
- The guide body is immobilized by screwing in the valve body.
- The device comprises several valves controlling the flow of the coating product toward the sprayer, these valves being aligned along a main axis of the supply device, while a subassembly of each valve that comprises the pneumatic driving means and the guide body is fitted in a cone trunk centered on an axis perpendicular to the main axis, whereof the small base, which is defined in a plane perpendicular to the central axis of the cone trunk and containing the main axis, has a diameter smaller than 20 mm and the half cone angle of which has a value comprised between 10° and 60°, preferably between 20° and 50°.

According to another aspect of the invention, the latter relates to a tool for mounting/dismounting a device as mentioned above, more particularly a device whose guide body is screwed on the valve body and whose head is equipped with rotational driving reliefs. This mounting/dismounting tool comprises an end-piece, equipped with reliefs complementary to the driving reliefs that equip the head, as well as a maneuvering handle.

This mounting tool makes it possible to maneuver, quite practically, the guide body during mounting/dismounting operations of the valves belonging to the device according to the invention.

According to advantageous but optional aspects of the invention, such a tool may incorporate one or more of the following features, considered in any technically allowable combination:

- The complementary reliefs are parallel to a central axis of the tool.
- The complementary reliefs are formed by at least two lugs designed to be engaged each in a longitudinal notch arranged on the head and that forms a rotational driving relief of the guide body around the screwing axis on the valve body.
- Each lug is made up of a metal slug with a shape complementary to that of the notch in which it is intended to be engaged.
- The end-piece is equipped with axial retaining means, in the end-piece, of a subassembly comprising the guide body.
- The axial retaining means comprise an O-ring mounted in a peripheral groove arranged around the end-piece and the O-ring is in contact with part of the subassembly, when the driving reliefs and the complementary reliefs cooperate.
- The handle is secured in rotation with the end-piece using a disconnectable connection based on a resisting torque exerted by the guide body of the valve.

The invention will be better understood and other advantages thereof will appear more clearly in light of the following description of five embodiments of a supply device and a mounting/dismounting tool according to its principle, provided solely as an example and done in reference to the appended drawings, in which:

FIG. 2 is a side view of the supply device of FIG. 1, in the direction of arrow II in FIG. 1;

FIG. 3 is a top view of the device of FIGS. 1 and 2;

FIG. 12 is an enlarged sectional view along line XII-XII in FIG. 2;

FIG. 13 is a sectional view along line XIII-XIII in FIG. 3 on the same scale as FIG. 12;

Figure 1:
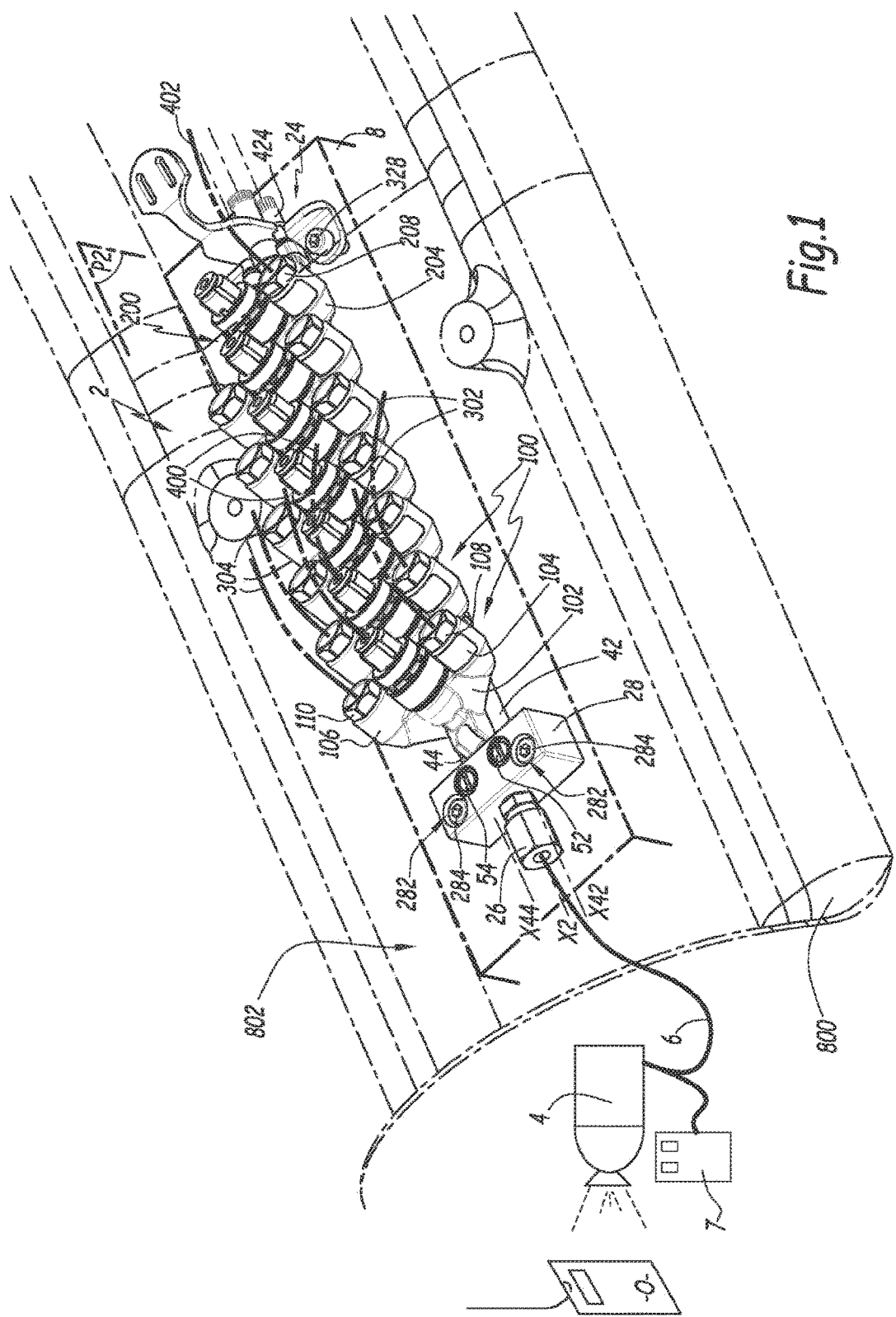
FIG. 1 is a perspective view of a supply device according to the invention.

The device 2 shown in FIGS. 1 to 12 is used to supply liquid coating product to an automatic sprayer 4 shown very diagrammatically, only in FIG. 1. The device 2 is connected to the gun 4 by a flexible pipe 6 and extends, along a longitudinal axis X2, between a front end 22 and a rear end 24.

The sprayer 4 is of the electrostatic type and connected to a high-voltage unit 7. The gun 4 is used to spray a cloud of droplets of coating product charged at the high-voltage toward objects O to be coated, shown diagrammatically by a plate suspended from a hook of a conveyor.

Alternatively, the sprayer may not be electrostatic.

The device 2 is installed inside the arm 800 of a multiaxial robots that, for clarity of the drawing, is shown in mixed lines in FIGS. 1 and 12 only. The arm 800 defines an opening 802 for accessing the device 2 from above in FIG. 1. This opening 802 is normally closed off by a removable cover that is not shown in FIG. 1.

The front end 22 is equipped with a connector 26 allowing the connection of the flexible pipe 6. When it is used, the device 2 is mounted on a support platen 8 integrated into the arm 800. Alternatively, it involves any other structural part making it possible to support the device 2, in particular in the case where the device 2 can be used to supply a manual gun with coating product moved across from the objects O by an operator.

The device 2 comprises a front block 28 provided with two piercings 282 for the passage of screws 284 immobilizing the front block 28 on the structure 8.

A support member 32 is provided at the rear end 24 of the device 2 and is equipped with orifices (not shown) for the passage of screws 328 for fastening the member 32 on the structure 8.

Between the front block 28 and the support member 32, the device 2 comprises two rails 42 and 44 that each extend along a longitudinal axis X42, X44, respectively, parallel to the axis X2. The rails 42 and 44 are identical. As shown by FIG. 2, for the rail 44, and based on the length of the device 2 along the axis X2 that depends on the number of its valves, these rails can be formed from two parts 44A and 44B placed end-to-end. This is optional.

Between the front block 28 and the rear support member 32, six identical recirculation valves 100 and one valve 200 without recirculation are arranged. The six valves 100 are arranged, along the axis X2, between the front block 28 and the valve 200. In other words, along the axis X2, the valve 200 is situated behind the valves 100.

Figure 7:
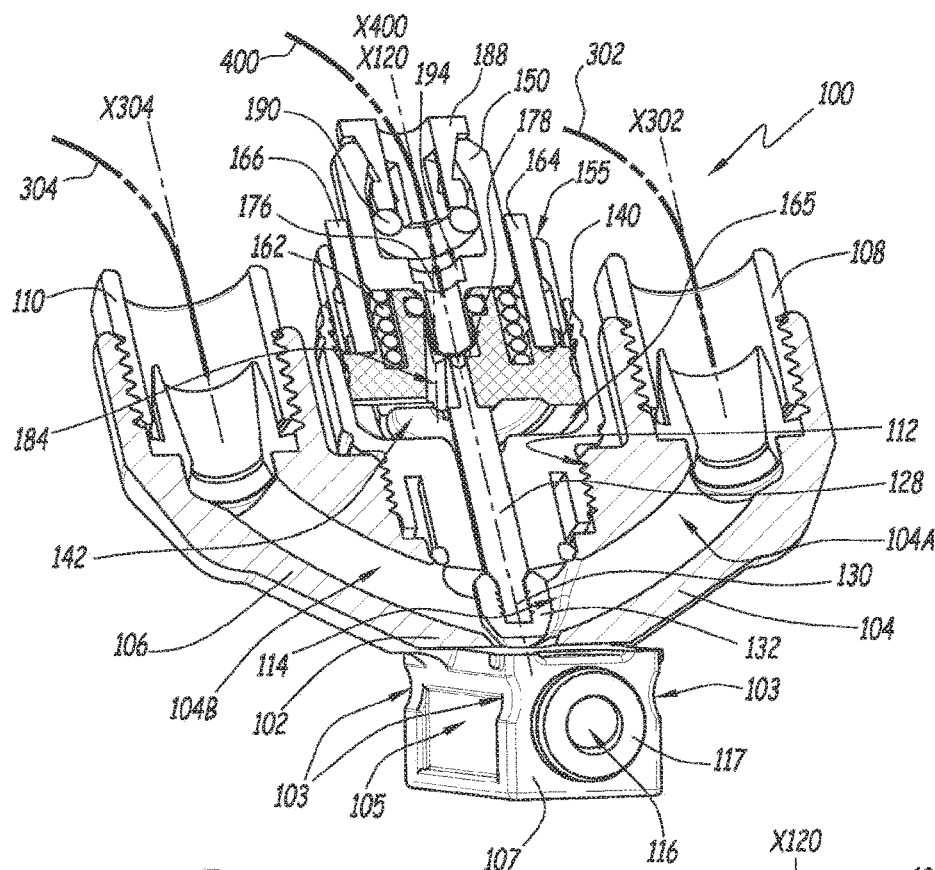
FIG. 7 is a perspective sectional view along line VII-VII in FIG. 5.
Figure 8:
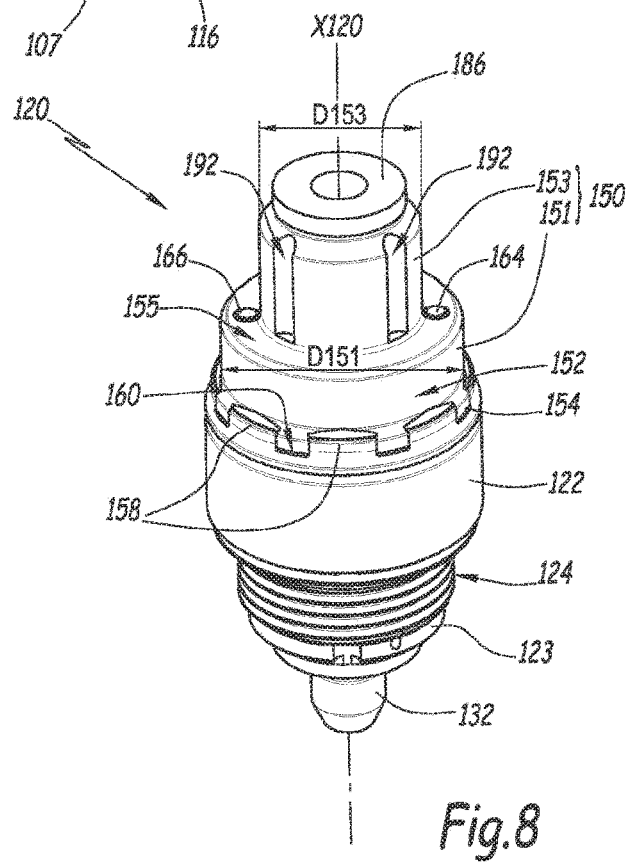
FIG. 8 is a perspective view of a subassembly belonging to the valve of FIGS. 5 to 7.
Figure 9:
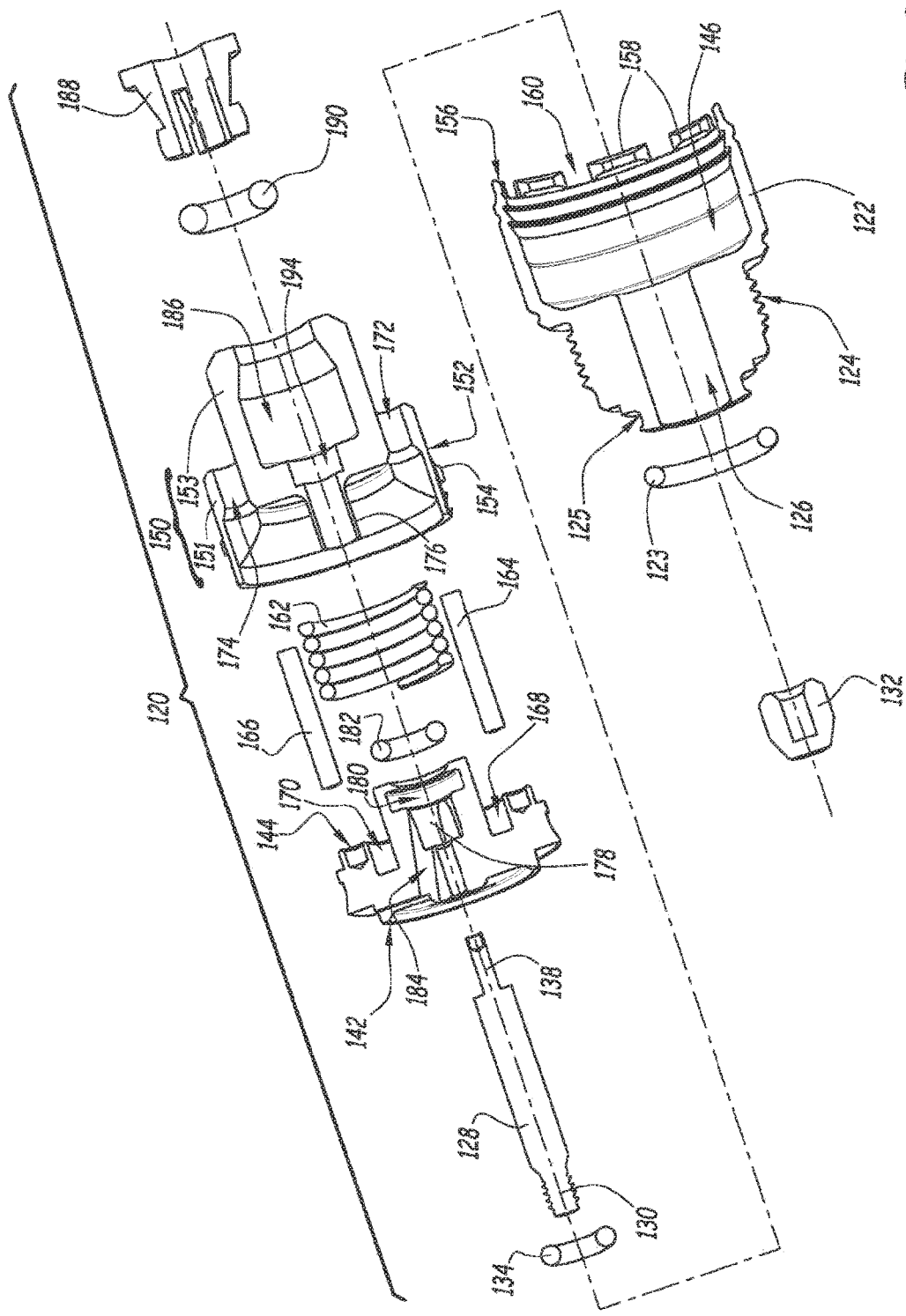
FIG. 9 is exploded and axial sectional perspective view of the subassembly of FIG. 8.
Figure 10:
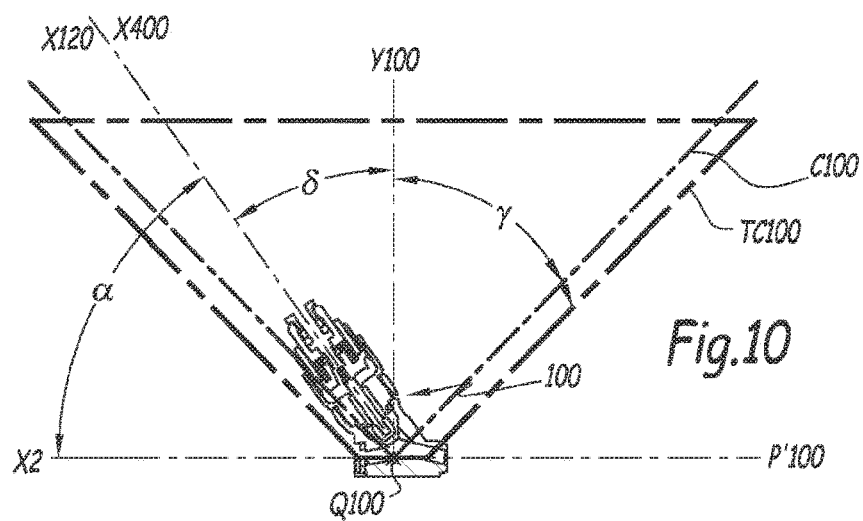
FIG. 10 is a sectional view similar to FIG. 5, on a smaller scale, making it possible to identify an access zone to the subassembly of FIGS. 8 and 9.
Figure 11:
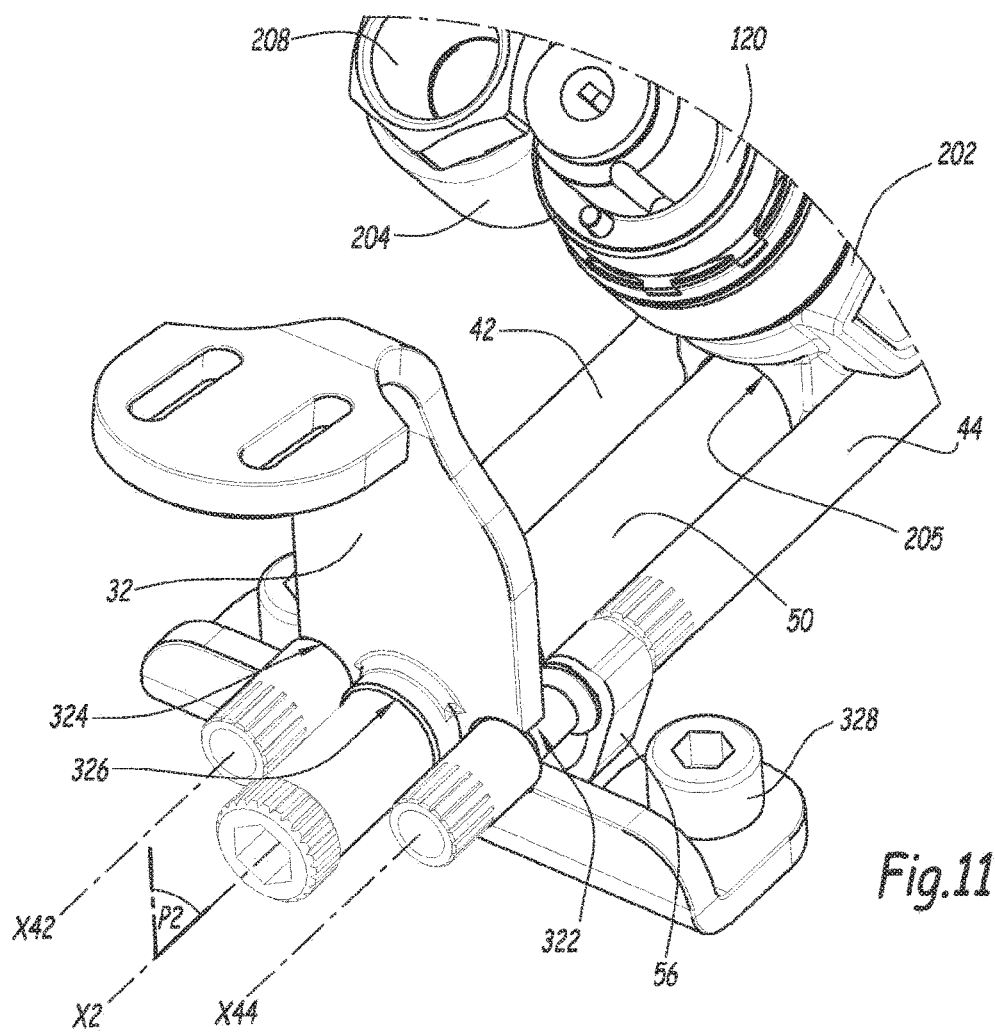
FIG. 11 is a partial perspective view, from behind, of the device of FIGS. 1 to 4.
Figure 14:
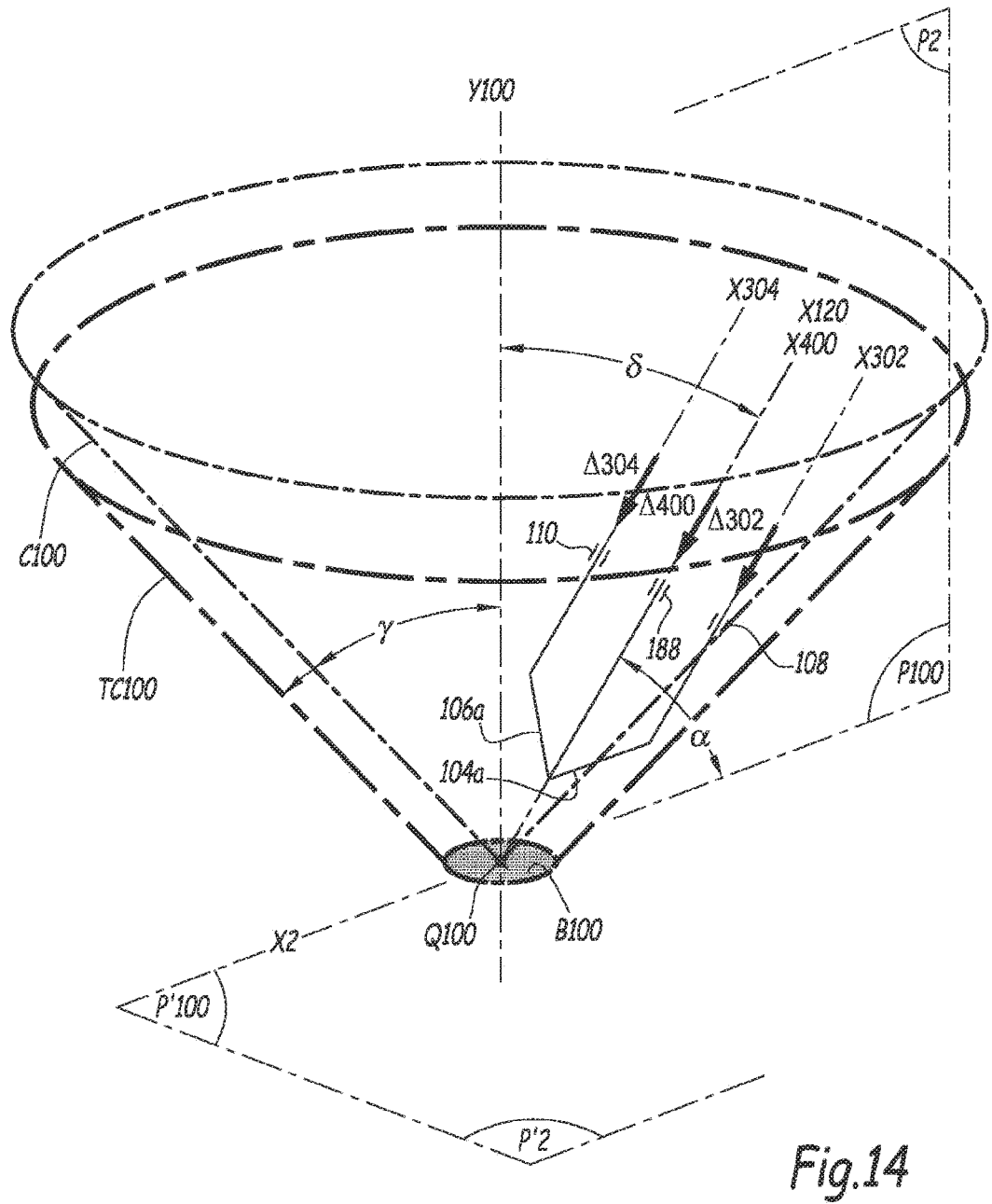
FIG. 14 is a diagrammatic illustration of certain axes and remarkable points defined by the device of FIGS. 1 to 13.

Each valve 100 comprises a valve body 102 that is advantageously made from metal and defines two lateral branches 104 and 106 on which two connectors 108 and 110 are respectively mounted making it possible to immobilize two flexible pipes 302 and 304 that are respectively used to bring a liquid coating product to the valve body 102 and to discharge this product toward a recirculation circuit, in order to avoid stagnation of the coating product in a valve 100 when that valve is closed. For the clarity of the drawing, the pipes 302 and 304 associated with the two valves 100 closest to the front block 28 are shown in FIGS. 1, 2 and 7 by their axis lines. They are not shown for the other valves, or in the other figures.

The connectors 108 and 110 define two zones, visible in particular in FIG. 7, for connecting pipes 302 and 304 on the valve bodies 102.

The axes X120 and X302 are coplanar. However, this is not mandatory.

The valve 200 is comparable to the valves 100, but differs therefrom by the fact that its body 202 comprises a single lateral branch 204 on which a flexible pipe 402 is connected using a connector 208, as shown in mixed lines in FIGS. 1 and 2 only. The valve 200 is supplied with cleaning product, for example water with additive, without it being necessary to provide recirculation of this product, resulting in the absence of a second lateral branch in the valve 200. For the rest, unless otherwise mentioned below, the valve 200 is built and operates in the same way as the valves 100.

Each valve 100 or 200 comprises a subassembly 120 screwed on its body 102 or 202, along an axis X120 contained in a median plane relative to the axes X42 and X44 and that forms an angle $\alpha$ of approximately 55° with the axis x2. In practice, the value of the angle $\alpha$ is chosen between 45° and 85°, preferably between 50° and 60°.

A comparable configuration is found for the valve 200, which defines axes X120 and X302 like the valves 100, but without axis X304.

The subassemblies 120 are all identical, including that of the valve 200.

Figure 4:
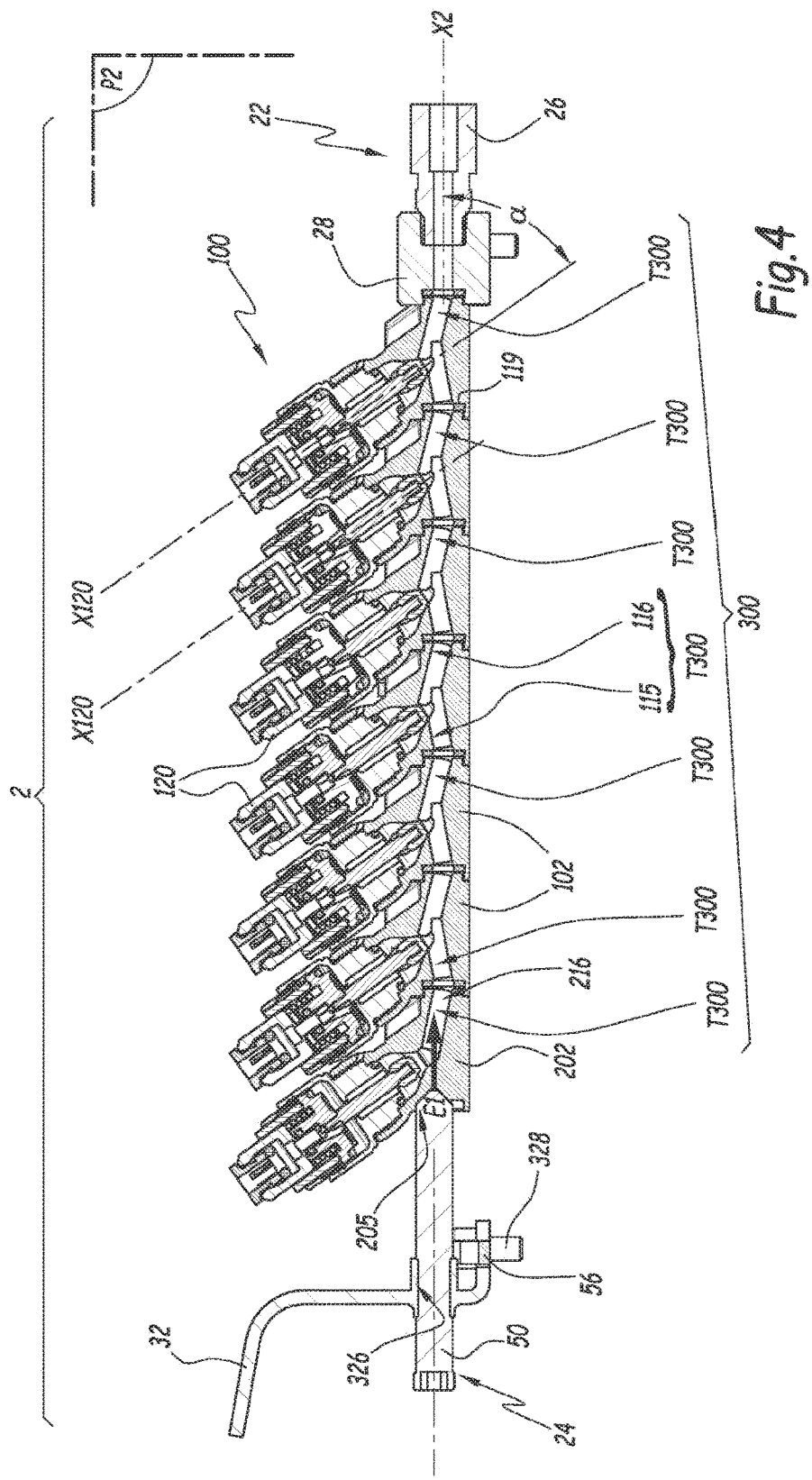
FIG. 4 is an axial sectional view, along a median plane P2 and along the line IV-IV, in FIG. 3.

As in particular shown by FIGS. 2 and 4, the axes X120 of the different subassemblies 120 are all inclined in the same direction relative to the axis X2.

During operation, a flexible air supply pipe 400 is connected on each valve 100 or 200 and penetrates the subassembly 120 of that valve in a direction M00 oriented toward the body 102 or 202 and aligned on a central axis X400 of the end of the tube 400 engaged in the subassembly 120. The axes X120 and X400 are parallel; in practice, they are combined. In the figures, the direction M00 is shown by an arrow.

The axis X120 of the subassembly 120 of a valve 100 is secant with the axis X2 at a remarkable point that is denoted Q100. Reference P100 denotes a plane containing the axis X2 and the axis X120 of the valve. This plane P100 is an median plane for this valve. Reference P'100 denotes a transverse plane perpendicular to the plane P100 of a valve 100 and containing the axis X2. Likewise, a remarkable point Q200, a median plane P200 and a transverse plane P'200 are defined for the valve 200.

In practice, the axes X120 of the different valves 100 and 200 are coplanar and the planes P100 and P200 of the different valves are combined in a plane P2 that is a median plane of the device 2. Likewise, the planes P'100 and P'200 are combined in a shared transverse plane P'2. Indeed, the axes X120 of the different valves are parallel to one another.

Reference Y100 denotes an axis passing through the point Q100 of a valve 100, perpendicular to the axis X2 and situated in its plane P100 or P2, i.e., coplanar to the axes X2 and X120. The axis Y100 is perpendicular to the plane P'2.

Reference C100 denotes an imaginary cone centered on the axis Y100 of a valve 100 and the apex of which is formed by the point Q100. The apical half-angle $\gamma$ of the cone C100 has a value comprised between 10° and 50°, preferably between 30° and 45°. For example, the angle $\gamma$ can have a value equal to 44°, which is fully advantageous.

The axis X120 is fitted in the cone C100.

Reference $\delta$ denotes an angle defined between the axes X120 and Y100, within the cone C100. The sum of the values of the angles $\alpha$ and $\delta$ is equal to 90°. The angle $\delta$ has a value greater than 5° and less than 45°, preferably between 30° and 40°. In other words, the axes X120 are neither perpendicular nor practically perpendicular to the planes P2 and P'2.

We consider, for each valve 100, a cone trunk TC100 centered on the axis Y100, the half cone angle of which is equal to the angle $\gamma$, the small base B100 of which, which is a disc contained in the plane P'2, has a diameter smaller than or equal to 20 mm and the axial length of which, along the axis Y100, is less than or equal to 100 mm. The subassembly 120 of each valve 100 is included in its cone trunk TC100. The same is true for the subassembly 120 of the valve 200.

References X302 and X304 respectively denote the ends of the pipes 302 and 304 engaged in the couplers 108 and 110. References $\Delta$302 and $\Delta$304 respectively denote the engagement directions of the pipes 302 and 304 in the couplers 108 and 110, these directions being oriented toward the body 102, shown by arrows in the figures and aligned on the axes X302 and X304, which in turn are aligned with the respective central axes of the couplers 108 and 110. The axes X120, X302 and X304 and the directions $\Delta$302, $\Delta$304 and M00 are coplanar, in the cutting plane of FIG. 7. This facilitates the orientation of the bundle of pipes 302, 304 and 400 inside the arm 800, since these pipes are globally oriented in the same direction, to the right in FIG. 1 or to the left in FIG. 2.

The couplers 108 and 110 define connecting zones of the pipes 302 and 304 on the body 102. An elastically deformable bush 188 defines a connecting zone of the pipe 400 on the subassembly 120. The elements 108, 110 and 188 are situated on a same side of the plane P'2. Furthermore, the directions $\Delta$302, $\Delta$304 and $\Delta$400 are oriented, from the elements 108, 110 and 120, toward the plane P'2, on the same side thereof.

Thus, if we consider that the plane P'2 is horizontal, as shown in the figures, the cone C100 is situated above this plane and the directions $\Delta$302, $\Delta$304 and $\Delta$400 are oriented downward, from zones formed by the elements 108, 110 and 188 that are situated above this plane.

Owing to this arrangement, access to the subassembly 120, in particular for mounting and dismounting the flexible pipes 302, 304 and 400, as well as for tightening and loosening couplers 108 and 110 and the bush 188, can be done inside the cone C100, on a same side of the plane P'2, without notable interference with the adjacent valves 100 and 200 and with the direct environment of the device.

This greatly facilitates the work of an operator, both during the initial assembly of the device 2 and during subsequent maintenance operations, ensured by reduced access on a single "upper" face, perpendicular to the axis Y100, of the device 2 and not at the perimeter or half-perimeter with axis X2 traditionally useful for an equivalent prior generating device.

Indeed, if we consider a valve 100 in the plane of FIG. 12, the latter is then surrounded by the arm 800 of the robot, on its two left and right lateral sides and from below. It remains accessible from above, through the opening 802 in which the cone C100 and the cone trunk TC100 fit.

In particular, it is possible to access the valve 100 in the directions of the arrows F1 in FIG. 12, without it being necessary to access it in the directions of the arrows F2, this access also being hindered by the presence of the robot arm 800.

By comparing FIGS. 1, 2, 7, 10, 12 and 14, one understands that the beginnings of the pipes 302, 304 and 400, which are positioned by the elements 108, 110 and 188, are situated in the cone C100 and the cone trunk TC100.

In practice, in light of their respective diameters, the tubes supplying coating product 302 and 304 are substantially more rigid than the air supply tubes 400. Thus, in one possible, although less preferable solution, the axes X302 and X304 are coplanar within the cone C100, while the axis X120 can be positioned in another plane.

In this case, it is possible to consider that the axis X120 forms, with the axis X2, an angle α whose value is larger than that of the angle formed between the axes X302 and X2 or X304 and X2 projected in a plane parallel to that of FIG. 2.

Each subassembly 120 comprises a body 122 provided with an outer thread 124 designed to cooperate with a tapping 112 with axis X120 arranged in the body 102 or 202 of each valve 100 or 200. The body 122 is pierced with a bore 126 in which a rod 128 is positioned, a first end 130 of which is equipped with a needle 132. The tightness between the threaded body 122 and the rod 128 can be obtained by scraping seals or by a needle with bellows, which is not shown for simplification reasons.

In the mounted configuration of the subassembly 120 on the body 102 or 202 of a valve, the body 122 is stationary.

An O-ring 123 is mounted in an outer peripheral groove 125 of the body 122 and insulates the thread 124 and the tapping 112 from the product circulating in the valve.

A piston 140 is secured, at least in translation along the axis X120, and in practice also in rotation, with a second end 138 of the rod 128, opposite the end 130. In practice, the rod 130 and the piston 140 can be secured by gluing, clipping, crimping or bracing.

Reference 142 denotes the front face of the piston oriented toward the needle 132 and reference 144 denotes the rear face of this piston oriented opposite.

The body 122 is provided with a cavity 146 for receiving and guiding the piston 140, along the axis X120.

The subassembly 120 also comprises a head 150 that is assembled to the threaded body 122 to define a dual chamber in which the piston 140 slides. To that end, the head 150 is provided, on its outer radial surface 152, with teeth 154 that extend outward, radially to the axis X120, relative to the surface 152, and that form protruding reliefs. Furthermore, the body 122 is equipped, on its edge 156 opposite the needle 132, with slots 158 that define zones 160 between them for receiving teeth 154. Thus, when the elements 122 and 150 are assembled, the reliefs 154 and 158 cooperate to secure these elements both axially and in rotation relative to the axis X120.

Alternatively, the slots 158 and the zones 160 can be provided on the head 150, while the guide body is equipped with protruding reliefs, such as the teeth 154.

The subassembly 120 also comprises a spring 162 inserted between the piston 140 and the head 150 and two slugs 164 and 166 respectively mounted in two housings 168 and 170 arranged on either side of the axis X120. In other words, the housings 168 and 170 are diametrically opposite relative to the axis X120. Each slug 164 and 166 extends in a direction parallel to the axis X120 and is engaged in a through piercing 172, 174, respectively, of the head 150. The piercings 172 and 174 are also diametrically opposite relative to the axis X120.

Alternatively, more than two slugs similar to the slugs 164 and 166 can be provided, preferably regularly distributed around the axis X120.

The head 150 is provided with an end-piece 176, in the form of a tube segment, engaged in a transfer chamber 178 arranged in the piston 140 and centered on the axis X120. The transfer chamber 178 emerges on the face 144 of the piston 140. On the opposite side, it is closed off by the end 138 of the rod 130. Near its outlet on the face 144, the transfer chamber 178 is provided with an inner radial groove 180 in which an O-ring 182 is received that is also in contact with the outer radial surface of the end-piece 176. Thus, the end-piece 176 is engaged tightly in the transfer chamber 178.

The end-piece 176 forms a single piece with the rest of the head 150. Alternatively, it can be attached on that head.

A line 184 connects the transfer chamber 178 to the front face 142 of the piston 140.

Opposite the end-piece 176, the head 150 is provided with a bore 186 in which the elastically deformable bush 188 is engaged. An O-ring 190 is also received in the bore 186, between the bush 188 and the bottom of this bore.

The outer radial surface 152 of the head 150 is stepped. In other words, the head 150 comprises a first portion 151, at which the outer radial surface 152 has a first outer diameter D151, and a second portion 153, at which the outer surface 152 has a second diameter D153 strictly smaller than the diameter D151. An annular surface 155, perpendicular to the axis X120 and centered thereon, connects the two cylindrical portions of the surface 152 with radius D151 and D153. At the portion 153, the head 150 is provided with four notches 192 that are regularly distributed around the axis X120 and are longitudinal, i.e., that extend parallel to the axis X120. For the most part, the bore 186 is arranged in the portion 153 of the bush 150.

Since the head 150 is immobilized on the guide body 122 by the reliefs 154 and 158, the notches 192 are secured to the body. In this sense, the guide body is equipped with notches 192.

With the exception of the rod 128, which is made from metal, as well as the spring 162, the component elements of the subassembly 120 are made from synthetic material. In particular, the needle 132 can be made from Nylon (registered trademark).

Figure 5:
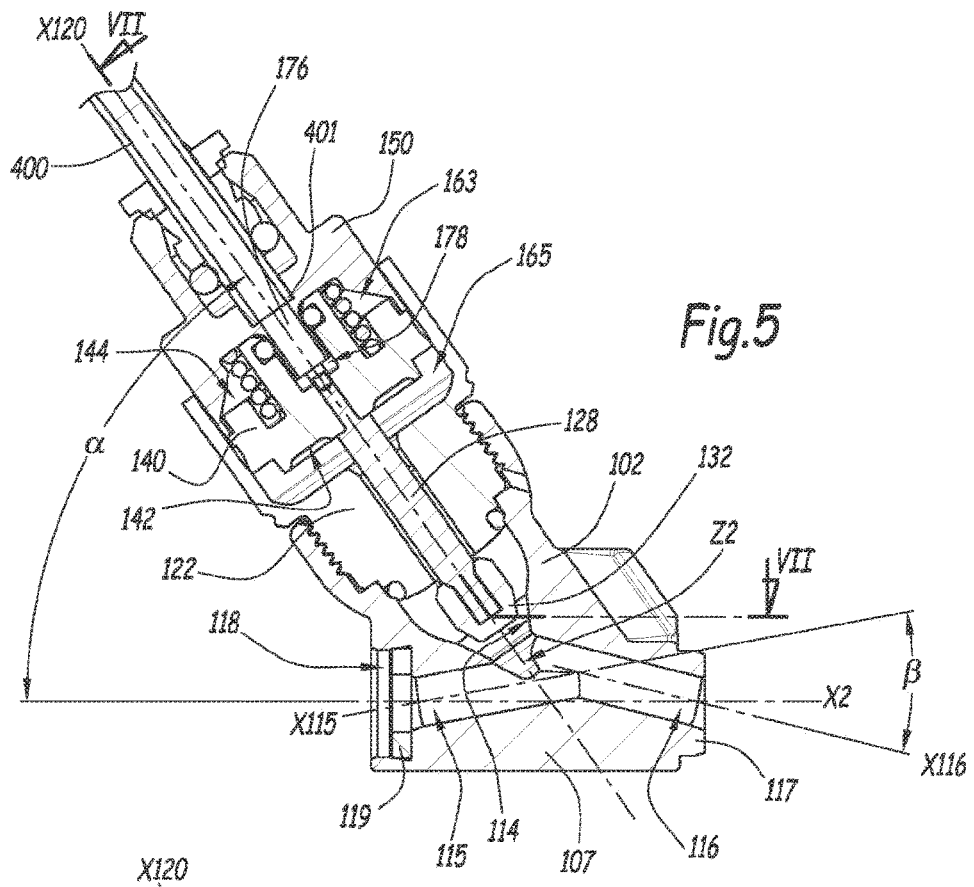
FIG. 5 is an enlarged sectional view, in the plane of FIG. 4, of a valve belonging to the device of FIGS. 1 to 4, this valve being in a first open configuration.
Figure 6:
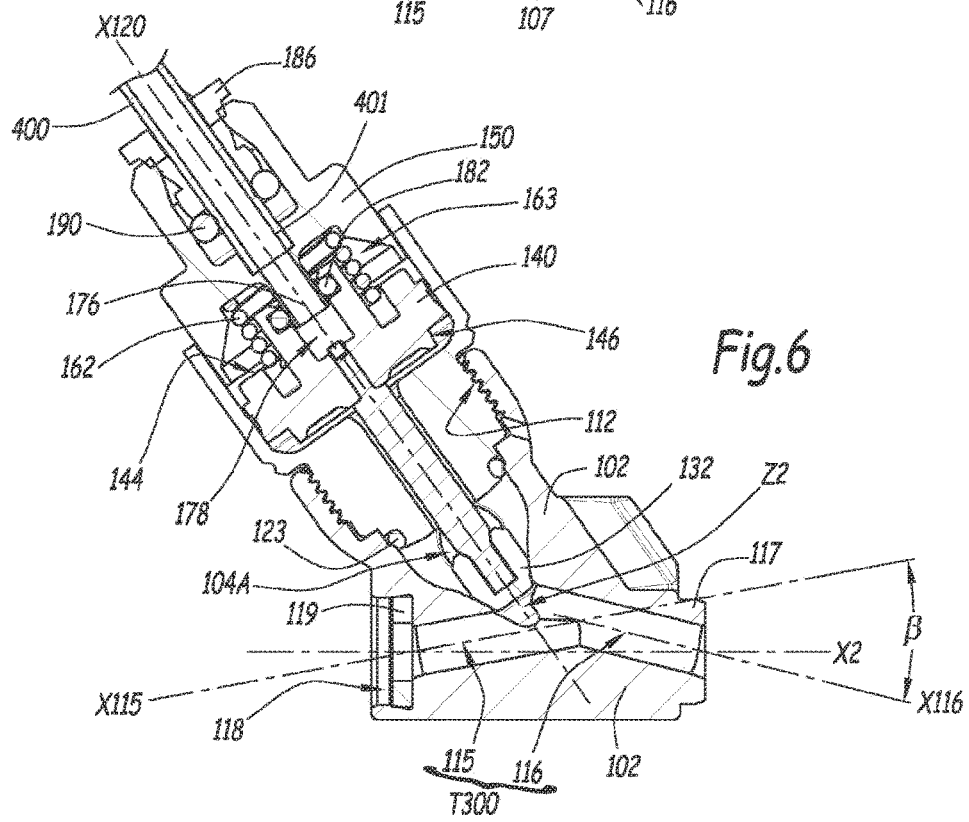
FIG. 6 is a view similar to FIG. 5 when the valve is in a second closed configuration.

The body 102 of the valve 100 defines a seat 114 for receiving the needle 132, the needle 132 being movable relative to this seat between a first configuration shown in FIGS. 5 and 7, in which the needle 132 is separated from the seat 114, and a second position shown in FIG. 6, where the needle 132 bears against the seat 114. In the configuration of FIGS. 5 and 7, the valve 100 is open. In the configuration of FIG. 6, it is closed.

The longitudinal axis X2 of the device 2 defines a direction in which the coating product globally flows, downstream from the needles of the different valves, toward the front block 28.

As more particularly shown by FIG. 4, a shared collector 300 is formed by line segments T300 arranged in the bodies 102 and 202 of the valves 100 and 200, these line segments being placed end-to-end, along the axis X2.

Each line segment T300 arranged in the body 102 of a valve 100 comprises two branches, i.e., an upstream branch 115 and a downstream branch 116. Unlike the valves 100, the line segment T300 arranged in the body 202 of the valve 200 only comprises a downstream branch 216.

At its downstream end, each branch 116 is surrounded by a cylindrical portion 117 with a size adapted to penetrate a bore 118 of the body 100 of another valve, this bore 118 being arranged around the mouth of the upstream branch 115 of this body. In other words, the cylindrical portion or "nose" 117 of a valve 100 is engaged in the bore or "basin" 118 of the valve 100 situated downstream, which allows a tight connection between the segments T300 of the collector 300 defined by the different bodies 102 and 202. As shown in FIG. 4, the front block 28 comprises a "basin" compatible with the "nose" of the valve 100 closest to that block. Likewise, the body 202 of the valve 200 comprises a "nose" introduced into the basin of the valves 100 furthest upstream.

A seal 119 is positioned at the bottom of each basin and receives the nose 117 of the valve situated immediately upstream by bearing.

As shown by comparing FIGS. 5 and 6, the axis X120 constitutes an axis of separation/approach of the needle 132 relative to the seat 114.

In the configuration of FIG. 6, and in light of the incline of the axis X120 by the angle α relative to the axis X2, a dead zone may be created downstream from the needle 132 if the segment T300 of the collector 300 formed by the branches 115 and 116 was rectilinear. To avoid creating such a dead zone and to favor the turbulence of the flow, thus facilitating the quality of the rinsing and the reduction of the consumption of rinsing products, the branches 115 and 116 are inclined relative to one another. More specifically, a longitudinal axis X115 and a longitudinal axis X116 of the branches 115 and 116 of a body 102 form an angle β between them greater than 10°, preferably comprised between 20° and 30°. In practice, the angle β can be chosen to be equal to approximately 25°.

Thus, in the configuration of FIG. 6, a zone $Z_2$ situated immediately downstream from the needle 132 is licked by the coating product or the cleaning liquid circulating in the collector 300, which avoids the accumulation and drying of coating product in that zone.

By default, the valve 100 is closed under the action of the spring 162, which exerts an elastic force on the piston 160 that presses the needle 132 against the seat 114. The spring 162 is positioned in a variable volume chamber 163 that is defined between the rear face 144 of the piston 140 and the head 150, around the end-piece 176.

Furthermore, a second variable volume chamber 165 is defined inside the cavity 146, between the front face 142 of the piston 140 turned toward the needle 132 and the bottom of the cavity 146, opposite the edge 156. The line 184 constitutes means for creating fluid communication between the chambers 165 and 178.

During operation, the flexible pipe 400 connected on each valve 100 or 200 is engaged in the head 150, up to a bore 194 that emerges in the end-piece 176. For clarity of the drawing, the flexible pipe is visible in FIGS. 5 and 6 and is shown by its axis line in FIGS. 1 and 7 only. The bore constitutes a connecting zone of the pipe 400 on the subassembly 120. The diameter of the bore 194 is adapted to the outer diameter of the pipe 400 to prevent air leaks. The same is true for the O-ring 190. The bush 188 immobilizes the end 401 of the pipe 400 in the bore 194.

When the needle 132 needs to be unstuck from the seat 114, i.e., when the valve needs to be taken from the closed configuration of FIG. 6 to the open configuration of FIGS. 5 and 7, air is sent to the valve 100, through the line 400, from a commanded supply unit (not shown) supplying the valves 100 and 200 with air. The air conveyed by the pipe 400 penetrates the end-piece 176 and flows toward the transfer chamber 178. It cannot flow toward the variable volume chamber 163 because it is prevented from doing so by the O-ring 182. The air therefore flows, from the transfer chamber 178, through the line 184, from which it penetrates the chamber 165. When the quantity of air injected by the end-piece 400 is sufficient, this quantity of air, which spreads in the chamber 165, increases in pressure and pushes the piston 140 back against the elastic force exerted by the spring 162, which separates the needle 132 from the seat 114. One is then in the configuration of FIGS. 5 and 7.

During this movement of the piston 140, the end-piece 176, which is stationary like the rest of the head 150, slides in the transfer chamber 178, tightly owing to the seal 182.

When the supply units stop supplying pressurized air, the air pressure in the chamber 165 decreases and the spring 162 pushes the piston 140 and the needle 132 back toward the seat 114.

Thus, the piston 140, therefore the rod 130 and the needle 132, are effectively commanded in axial translation along the axis X120, without it being necessary for the flexible pipe 400 to be moved during the movements of the piston. Any contact between this pipe 400 and the environment does not hinder the driving of the needle 132 relative to the seat 114 of the valve 100. Even if the flexible pipe 400 can be curved before penetrating the head 150, in particular when the device 2 is positioned inside the arm of a multiaxial robot whereof a cover covers the different flexible pipes 400, this has no negative impact on the steering of the different valves 100 and 200.

As shown by FIG. 7, each branch 104 and 106 of the body 102 defines a circulation line 104A and 106A of the coating product between the couplers 108 and 110, these lines 104A and 106A coming together around the rod 128 and/or the needle 132. Thus, in the closed configuration of the valve 100, the coating product circulates around the rod 128, from the pipe 302 toward the pipe 304 without being blocked inside the valve 100. On the contrary, when the valve 100 is in the open configuration shown in FIGS. 5 and 7, the coating product flows in the collector 300, in particular in the downstream branch 116 of the valve 100 in question, toward the front block 28.

FIG. 7 shows that the slugs 164 and 166 protrude along and around the portion 153 of the head 150 when the piston 150 is pushed back against the action of the spring 162 by the pressure prevailing in the chamber 165. On the contrary, when the piston is in the configuration of FIG. 6, the slugs 164 and 166 do not protrude from the planar annular surface 155. The slugs 164 and 166 are then in the configuration shown in FIG. 8. These slugs 164 and 166 therefore make it possible to deduce the position of the piston 140 in the cavity 146, and thus the position of the needle 132 relative to the seat 114. These slugs therefore form indicators of the position of the needle 132. Since they are positioned on either side of the axis X120, at least one of them is visible for a viewer of the device 2, irrespective of the viewing direction of a valve, even if the portion 153 conceals the other slug. The angular orientation of the slugs 164 and 166 around the axis X120 depends on the degree of tightening of each subassembly 120 in the body 102 or 202 of the valve to which it belongs, as well as the hazards of the manufacturing of the valves, in particular the angular position of the thread beginnings. These anticipated hazards make it possible to limit the manufacturing and assembly constraints of the heads and guide bodies of each subassembly 102, thus reducing manufacturing costs.

The support member 32 is equipped with a screw 50 that crosses through a tapped bore 326 of the member 32 and which makes it possible to exert a force E1 on the valve 200 that pushes all of the valves against the block 28, which ensures both mechanical immobilization of these valves relative to one another and fluid isolation of the collector 300 relative to the outside of the device 2. When the valves 100 and 200 have been put in place between the rails 42 and 44, the screw 50 is tightened against the body 202, which is provided with a blind housing 205 for receiving the front tip of the screw 50. When the device 2 needs to be dismounted, in particular to remove a valve 100 or 200, the screw 50 is unscrewed in the bore 326. The rear end of the screw 50 is provided with a hollow housing with six faces making it possible to receive a male key for driving screwing/unscrewing relative to the member 32.

FIG. 4 shows that the series of branches 115, 116 and 216 of the different valves 100 and 200 gives the collector 300 a zigzag shape in the plane of FIG. 4 that contains the different axes X120 of the valves.

The rail 42 is mounted on the front block 28 using a floating nut 52, while having a possibility of translation perpendicular to the axis X2, parallel to the plane P'2. This translation is allowed by the radial play present between the nut 52 and the front block 28 and the elastic deformation of two O-rings 52A and 52B that keep it in position without the mounting or removal force of valves 100 or 200. Likewise, the rail 44 is mounted on the front block 28 using a floating nut 54 and with a possibility of translation perpendicular to the axis X2, parallel to the plane P'2. This translation is allowed by the radial play present between the nut 54 and the front block 28 and the elastic deformation of two O-rings 54A and 54B that keep it in position without the mounting or removal force of valves 100 or 200.

Reference 422 denotes the front end of the rail 42 engaged in front block 28. Reference 424 denotes the rear end of the rail 42, which cooperates with the member 32. Likewise, references 442 and 444 respectively denote the front and rear ends of the rail 44. The member 32 is provided with two notches 322 and 324 in which the rear ends 424 and 444 are respectively engaged. When the ends 424 and 444 are respectively engaged in the notches 322 and 324, the member 32 defines the separation between the rails 42 and 44, measured in a direction perpendicular to the axes X2 and X120 and parallel to the plane P'2.

The notches 322 and 324 are situated on either side of the plane P2 and outwardly open relative thereto.

An elastic staple 56 is mounted around the rails 42 and 46 and exerts an approach force E2 thereon perpendicular to the plane P2 and that tends to keep the ends 424 and 444 firmly engaged in the notches 322 and 324. Thus, by default, the rails 42 and 44 pinch the bodies 102 and 202 of the valves 100 and 200 between them. To ensure good immobilization of the bodies 102 and 202 by the rails 42 and 44, and as more particularly shown by FIG. 7, the body 102 of a valve 100 is provided, on either side of a heel 107 in which the branches 115 and 116 are engaged, with two lateral notches 103 in which the rails 42 and 44 are respectively inserted in the configuration of FIGS. 1 to 4. Indeed, the sides of the heels 107 are provided with lateral recesses 105. The notches 103 are respectively arranged near the front edge and the rear edge of the heels and between a recess 105 and the adjacent branch 104 or 106, as shown in FIG. 7.

Furthermore, a guide 58 is also provided, this guide gripping the rails 42 and 44 and straddling the heel of the valves 100 and 200; it opposes a removal movement of the valves 100 and 200 from the space defined between the rails 42 and 44, this movement being able to be caused by the traction force of the various supply pipes 302, 304 and 400.

When the number of valves 100 and 200 is high, guides 58 are placed at regular intervals on the rails 42 and 44 to guarantee good maintenance of all of those valves.

When a valve 100 needs to be inserted into the device 2 or such a valve needs to be removed, in particular for a maintenance operation, a force should be exerted on the valve globally along the axis Y100, in order to separate the rails 42 and 44 against the force E2, in the plane P'2 and perpendicular to the axis X2. This separation of the rails 42 and 44 is made possible by the crushing of the seals 52A, 52B, 54A and 54B that keep the floating nuts 52 and 54 in the front block 28, by the elastic deformation of the staples 56 and guide 58, and by the notches 322 and 324 of the support 32. Beforehand, it is necessary to loosen the screw 50 to release the force $E_1$.

When the rails 42 and 44 are thus separated and freed from the notches 103, it is then possible to add a valve 100 between the rails or to remove one therefrom.

Figure 17:
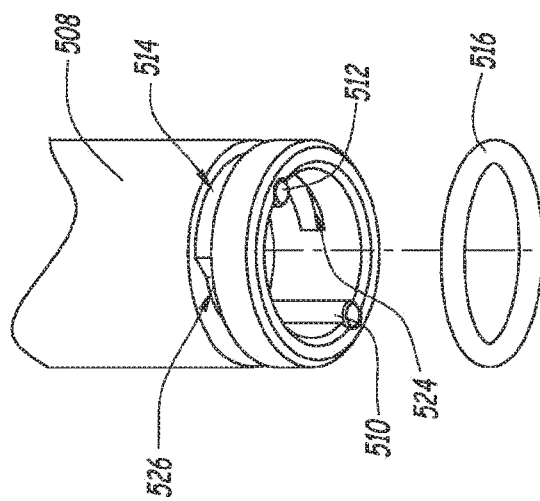
FIG. 17 is a partial and enlarged exploded perspective view of the tool of FIG. 16.

When all of the provided valves 100 and 200 are in place between the rails 42 and 44, the screw 50 can be tightened, or retightened in the case of a maintenance operation, and the ends 424 and 444 of the rails 42 and 44 automatically return to their place in the notches 322 and 324, under the action of the staples 56, guides 58 and centering cones of the rails present in the notches of the support 32. When there is cause to act on the subassembly 120 of one of the valves of the device 2, it is possible to use a tool like that shown in FIGS. 15 to 17, in relation with a second embodiment of the invention.

In the second to fifth embodiments, the elements similar to those of the first embodiment bear the same references. Unless otherwise specified, they work as in the first embodiment. Hereinafter, we primarily describe the differences between these embodiments and the first.

In the second embodiment, the supply device 2 of the gun 4 only comprises valves 200 with a single lateral branch 204. In other words, in this embodiment, no recirculation is provided for the coating product supplying each of the first six valves closest to the front block 28, having specified that the valve 200 furthest from this block is a supply valve for supplying the shared collector with cleaning product, as in the first embodiment.

This type of valve 200 without recirculation can be used with coating products for which there is no risk of sedimentation when the products lie around the needle 132 of a valve 200 in the closed configuration.

In this embodiment, the heels of the six valves 200 closest to the front block 28 define a shared collector segment T300 similar to that of the valves 100 of the first embodiment, with two nonaligned branches 115 and 116.

According to an aspect of the invention that is not shown that can be used in certain specific installations, the heel of a valve 200 may only have one branch similar to the branch 115 of a valve 100.

A tool 500 is used to screw or unscrew a subassembly 120 relative to the body 202 of a valve. Inasmuch as the subassemblies 120 of this embodiment are identical to those of the first embodiment, this tool 500 could also be used with the valves 100 of the first embodiment.

This tool 500 comprises a grip 502 centered on a longitudinal axis X500 of the tool 100, as well as a handle 504 also centered on this axis. The grip 502 is advantageously made from metal and comprises a knurled part 506. The handle 504 is advantageously made from a synthetic material and is knurled on the outside.

The grip 502 comprises an end-piece 508 that is hollow and in which two lugs 510 and 512 are positioned made up of two metal slugs with a circular section whereof the respective longitudinal axes are parallel to the axis X500. A peripheral groove 514 is arranged around the end-piece 500 and an O-ring 516 made from a synthetic material is engaged in this groove.

When a subassembly 120 must be mounted on the body 202 of the valve 200, the end-piece 508 of the tool 500 is engaged around the second portion 153 of the head 150 of the subassembly, by inserting the two lugs 510 and 512 in two opposite longitudinal notches 192 of the second portion 153.

Alternatively, the number of lugs 510 and 512 may be different from 2. These lugs are regularly distributed around the axis X500.

As a result, the grip 502 and the head 150 are secured in rotation around the axes X120 and X500, which are then combined. It is then possible to rotate the subassembly 120 to screw it into the body 102 or 202, by acting on the handle 504, in the direction of arrow F1 in FIG. 15.

It will be noted that the assembly between the handle 504 and the grip 502 is done using a screw 518 tightened in a tapped hole 520 of the grip 502 that extends along the axis X500, with the insertion of a series of Belleville washers 522. Thus, a torque exerted on the handle 504 is transmitted by adherence from the handle 504 onto the grip 502. The maximum transmitted torque value is determined by the number of Belleville washers 522 and the value of their compression. The compression value is defined by the length of the washer head screw 518. This adhesion link is disconnectable when it opposes the resisting torque exerted by the guide body 121. The resisting torque generates sliding between the handle 504 and the grip 502, as well as sliding between the stack of Belleville washers and the lower face of the screw head 518. In other words, this assembly mode of the tool 500 prevents the exertion of excessive torque during screwing of a subassembly 120 on the body 102 or 202 of a valve 100 or 200.

Figure 15:
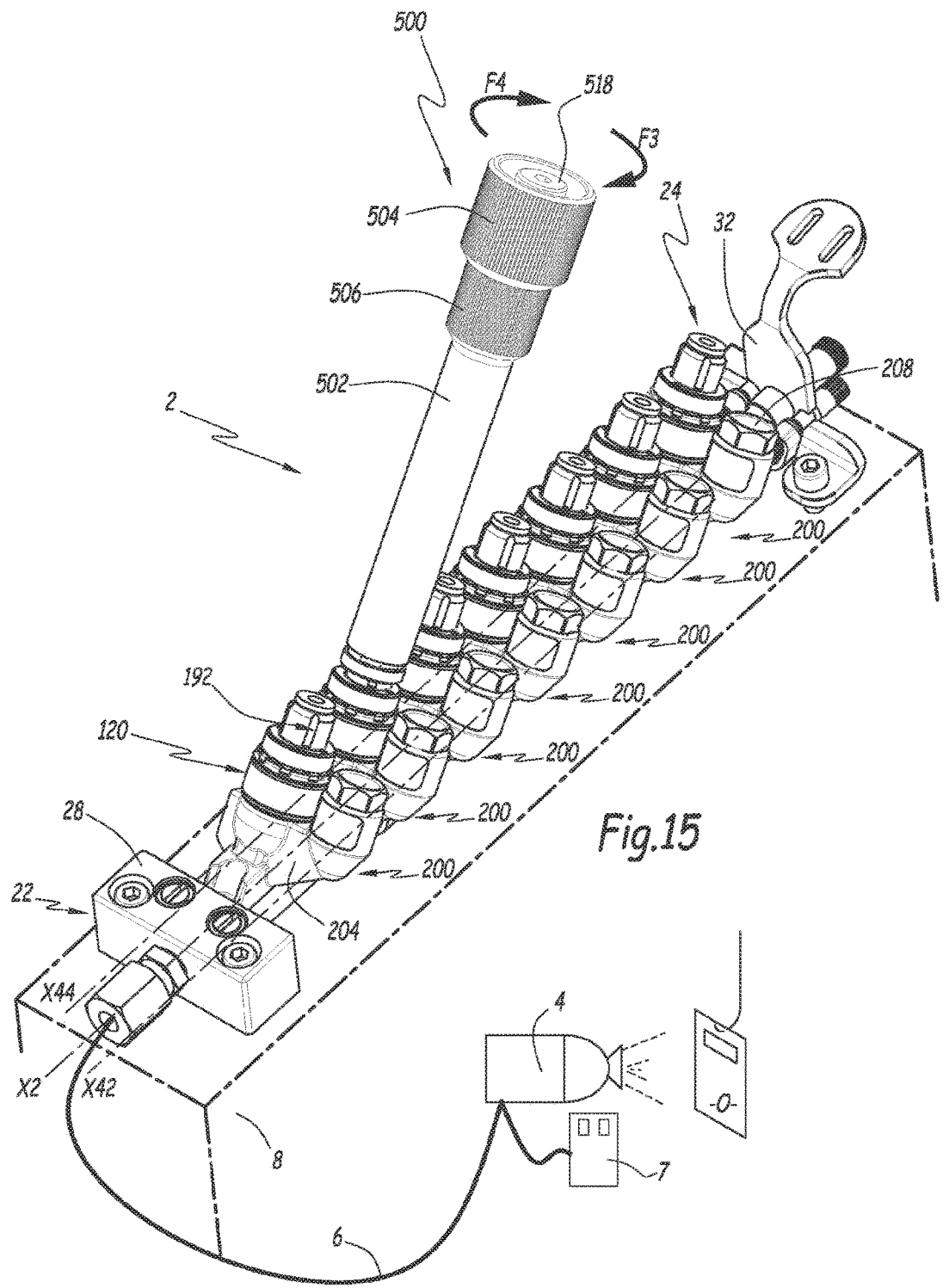
FIG. 15 is a perspective view comparable to FIG. 1 for a device according to a second embodiment of the invention, without depicting a robot arm.
Figure 16:
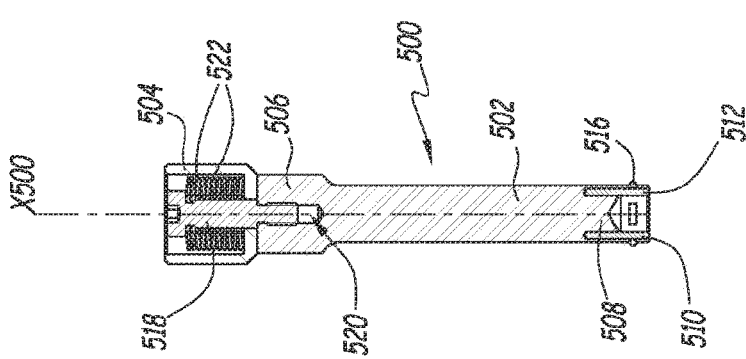
FIG. 16 is a longitudinal sectional view of a tool shown in the usage configuration in FIG. 15.

When it is necessary to unscrew a subassembly 120 previously mounted on a body 102 or 202, one need only cap this subassembly with the end-piece 508, then exert a torque on the handle 504 in the direction of arrow F4 in FIG. 15. When the resistant torque exerted by the subassembly 120 exceeds the maximum torque transmissible between the parts 502 and 504 due to the presence of the washers 522, it is possible for the operator to exert the unscrewing torque directly on the knurled part 506.

On two opposite angular sectors offset by 90° around the axis X500 relative to the lugs 510 and 512, the groove 514 emerges in the inner volume of the end-piece 508, to the point that two windows 524 and 526 are created through which the O-ring 516 comes into contact with the outer radial surface 152 of the portion 153 of the subassembly 120, when this portion is engaged inside the end-piece 508. This creates a frictional force that axially keeps the subassembly 120 in place at the end of the grip 502 opposite the handle 504.

Thus, the tool 500 makes it possible not only to rotate the subassembly 120, but also to move this subassembly in space without risking causing it to fall, the subassembly being kept in position at the end of the grip 502 opposite the handle 504, due to the contact force exerted radially by the O-ring 516 through the windows 524 and 526.

Figure 18:
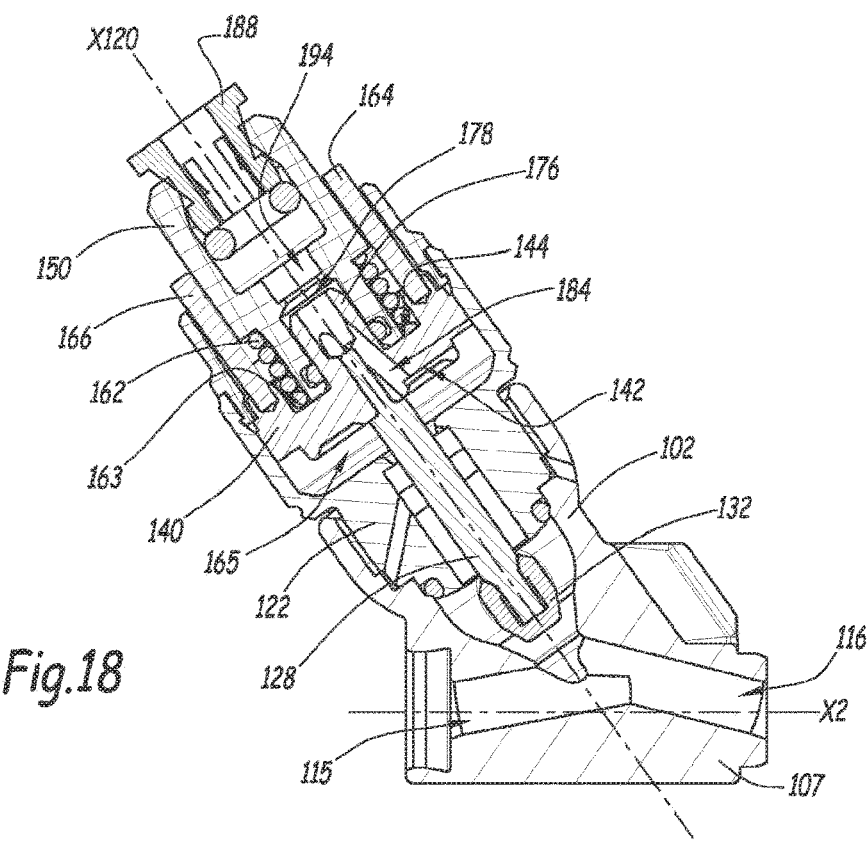
FIGS. 18 and 19 are sectional views respectively similar to FIGS. 5 and 6, for a device according to a third embodiment.
Figure 19:
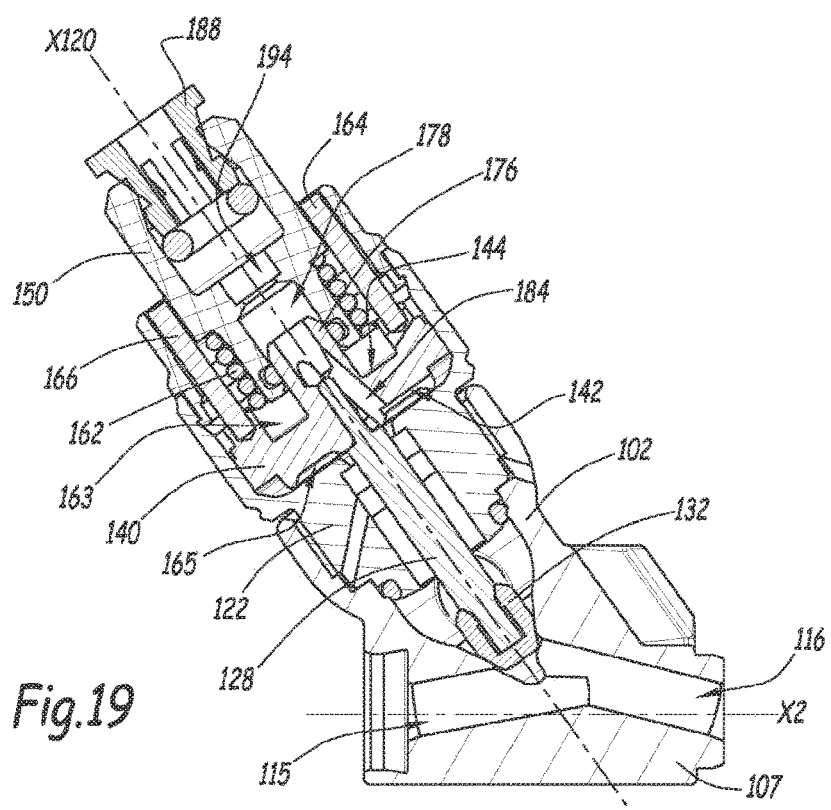

In the embodiment of FIGS. 18 and 19, the end-piece 176 is provided on the piston 140 of the subassembly 120, while the transfer chamber 178 is arranged in the head 150, at the outlet of the bore 194.

A first variable volume chamber 165 is defined between the surface 142 of the piston 140 turned toward the needle 132 and the threaded body 122. Furthermore, a second variable volume chamber 163 contains the elastic return spring 162 for returning the spring 140 to its position.

A line 184 connects the inner volume of the end-piece 176 to the chamber 165, through the piston 140.

This embodiment corresponds to an inverted structure relative to the first embodiment regarding the distribution of the end-piece 176 and the transfer chamber 178.

Figure 20:
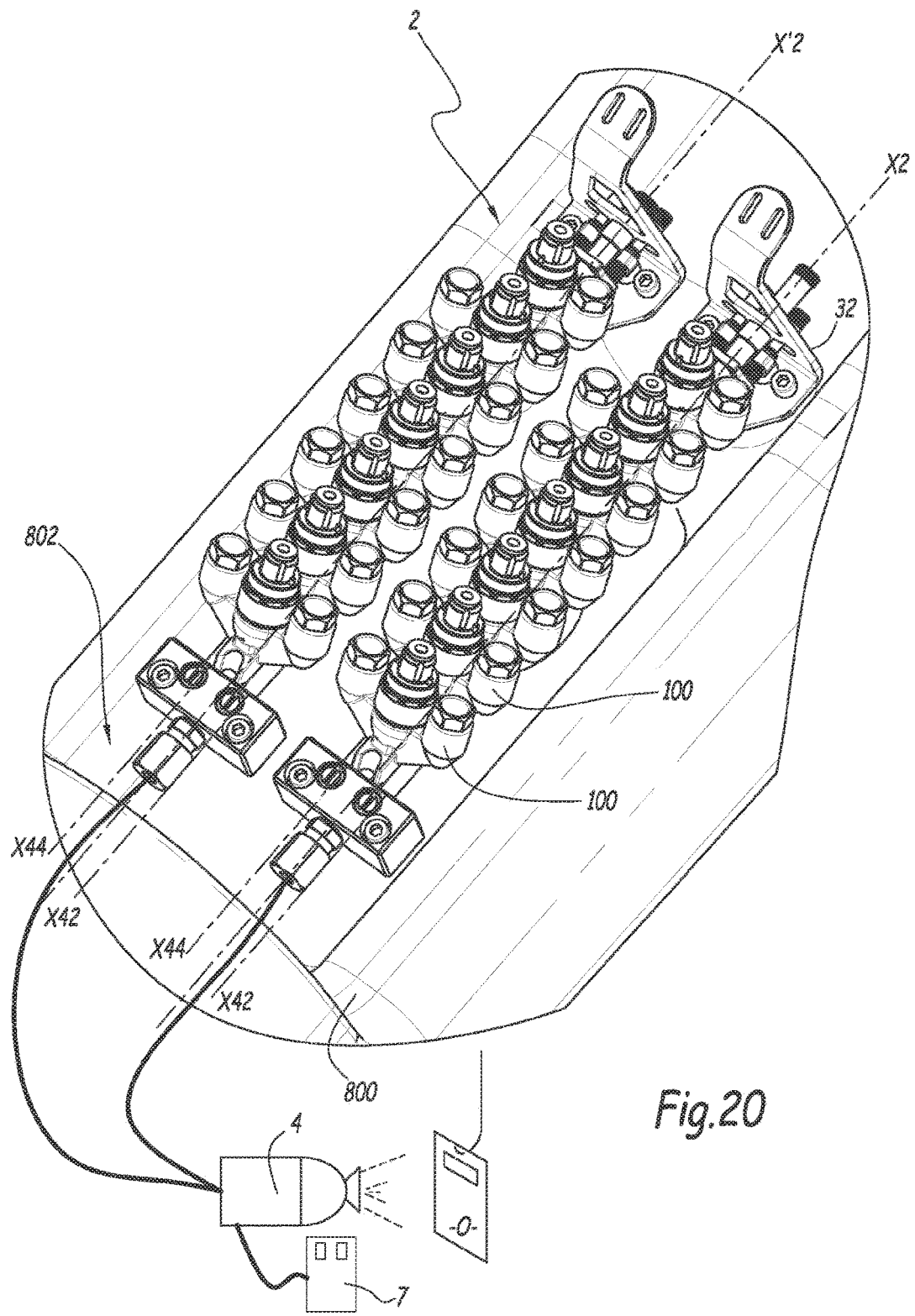
FIG. 20 is a perspective view comparable to FIG. 1 for a device according to a fourth embodiment of the invention.
Figure 21:
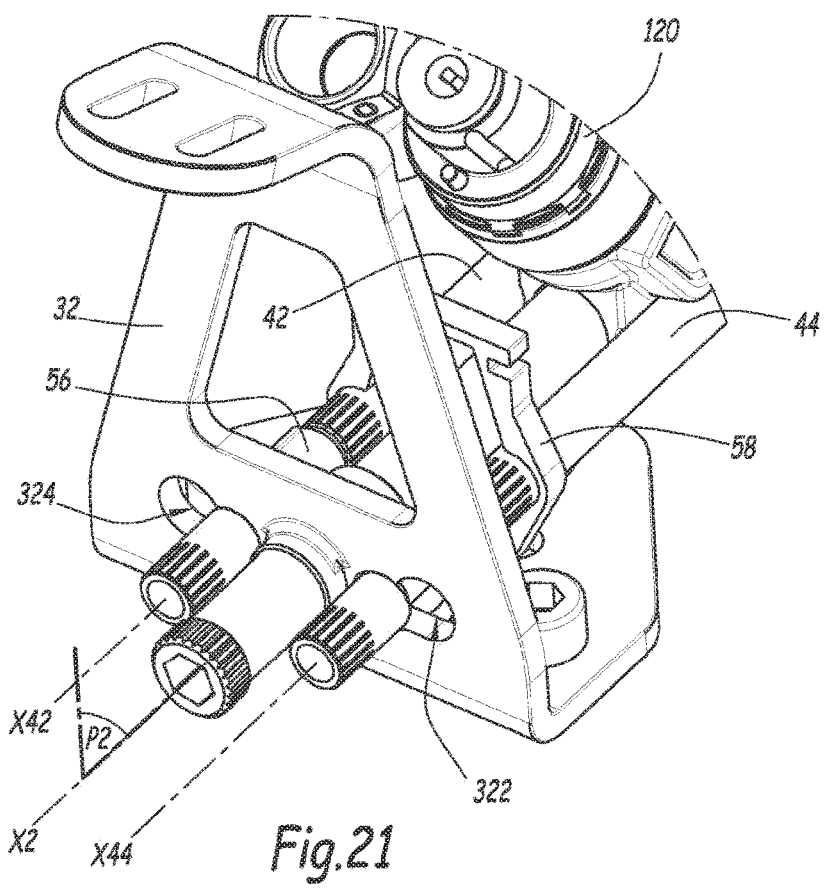
FIG. 21 is a partial perspective view, from the rear, of the device of FIG. 20.

In the fourth embodiment shown in FIGS. 20 and 21, the supply device of the sprayer 4 comprises two rows of valves 100, respectively aligned along two longitudinal axes X2 and X'2.

Two flexible pipes 6 and 6' connect these two rows of valves to the sprayer 4.

As more particularly shown by FIG. 21, the support member 32 of this embodiment is slightly different from that of the first embodiment, inasmuch as its notches 322 and 324 do not emerge toward the outside opposite the plane P2, but define two first zones in which the ends of the rails 42 and 44 are respectively received in the configuration gripped around the bodies 102 of the valves 100, as shown in FIG. 21. In the separated configuration, these ends are received in the portions of the notches 322 and 324 that are visible in this FIG. 21 and that are more separated from the plane P2 than the first zones.

Figure 22:
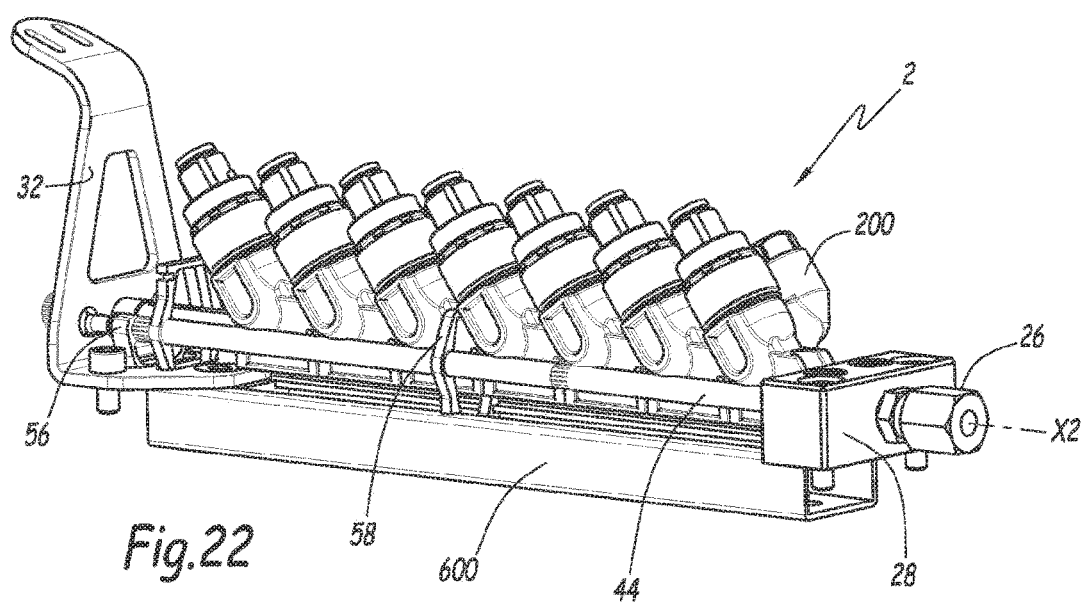
FIG. 22 is a perspective view of a device according to a fifth embodiment of the invention.

According to one aspect of the invention shown in FIG. 22 for the fifth embodiment, but which can be transposed to the other embodiments, if the rails 42 and 44 are relatively long, i.e., if a relatively large number of valves 100 or 200 are juxtaposed along the axis X2 in the device 2, an optional rail 600 can be put into place to increase the torsion and flexion inertia of the device 2 around the axis X2. This rail is secured to the rest of the device 2 by shape cooperation, in particular at the guide 58.

According to another embodiment of the invention that is not shown, the device 2 may comprise several valves 100 and several valves 200, the distribution of which depends on the type of coating product used.

In certain installations of the device according to the invention, the products can circulate in the collector 300 of the valve closest to the front block 28 toward the valve furthest from that block.

Irrespective of the embodiment, a gas other than air can be used to command the movements of the piston 140.

Irrespective of the embodiment, the device 2 can be used to supply an automatic sprayer or a manual gun, whether or not it is electrostatic.

In the second to fifth embodiments, and in the alternatives, it is possible to define, for each valve 100 or 200, a cone and a cone trunk like those defined with references C100 and TC100 for the first embodiment. The spatial relationship of the axes X120 and the subassemblies 120 of these valves to one another and to these cones and cone trunks is as explained in reference to the first embodiment.

The embodiments and alternatives considered above can be combined with one another to create new embodiments of the invention.

The invention claimed is:

1. A tool for mounting/dismounting a device for supplying at least one sprayer with a liquid coating product, the device comprising at least one valve controlling the flow of the coating product toward the sprayer, the valve comprising:
 a moving needle,
 a valve body that defines a circulation volume for the coating product and a bearing seat for the needle in the closed configuration of the valve,
 pneumatic driving means for translating the needle along an axis of separation/approach relative to the seat, the pneumatic driving means comprising a piston secured in translation to the needle and mounted sliding in a guide body,
 a head mounted on the guide body and defining, with the latter and a face of the piston, a variable volume chamber in which an elastic return member is provided for returning the piston to its position,
 wherein the head and the guide body are secured in rotation
  using corresponding reliefs arranged on the head and on the guide body and that comprise slots arranged on one edge of the guide body opposite the needle, and protruding elements arranged on an outer radial surface of the head, and received in spaces defined between the slots or
 using corresponding reliefs that comprise slots arranged on one edge of the head and protruding elements arranged on the guide body and received in spaces defined between the slots, and
 wherein the guide body is screwed on the valve body, with its screwing axis combined with the axis of separation/approach, and wherein the head is equipped with reliefs driving rotation around the screwing axis of the guide body on the valve body,
 wherein it comprises an end-piece, equipped with reliefs complementary to the driving reliefs equipping the head, as well as a maneuvering handle,
 wherein the end-piece is equipped with axial retaining means of a subassembly comprising the guide body, and
 wherein the axial retaining means comprise an O-ring mounted in a peripheral groove arranged around the end-piece and in that the O-ring is in contact with part of the subassembly, when the driving reliefs and the complementary reliefs cooperate.

2. The tool according to claim 1, wherein the complementary reliefs are parallel to a central axis of the tool.

3. The tool according to claim 2, wherein the complementary reliefs are formed by at least two lugs designed to be engaged each in a longitudinal notch, arranged on the head and that forms a rotational driving relief of the guide body around the screwing axis on the valve body.

4. The tool according to claim 3, wherein each lug is made up of a metal slug with a shape complementary to that of the notch in which it is intended to be engaged.

5. The tool according to claim 1, wherein the handle is secured in rotation with the end-piece using a disconnectable connection based on a resisting torque exerted by the guide body of the valve.

* * * * *

UNITED STATES PATENT AND TRADEMARK OFFICE
CERTIFICATE OF CORRECTION

Page 1 of 1

PATENT NO. : 10,137,468 B2
APPLICATION NO. : 15/031767
DATED : November 27, 2018
INVENTOR(S) : Stéphane Robert It is certified that error appears in the above-identified patent and that said Letters Patent is hereby corrected as shown below:

In the Specification

Column 5, Line 47, "MOO" should read -- $\Delta 400$ --

Column 5, Line 51, "MOO" should read -- $\Delta 400$ --

Column 6, Line 36, "MOO" should read -- $\Delta 400$ --

Signed and Sealed this
Twelfth Day of March, 2019

Andrei Iancu
*Director of the United States Patent and Trademark Office*